US010459820B2

(12) United States Patent
Sykora

(10) Patent No.: US 10,459,820 B2
(45) Date of Patent: Oct. 29, 2019

(54) DOCUMENT CLUSTERING IN IN-MEMORY DATABASES

(71) Applicant: SAP SE, Walldorf (DE)

(72) Inventor: Radim Sykora, Nussloch (DE)

(73) Assignee: SAP SE, Walldorf (DE)

(*) Notice: Subject to any disclaimer, the term of this patent is extended or adjusted under 35 U.S.C. 154(b) by 101 days.

(21) Appl. No.: 15/405,979

(22) Filed: Jan. 13, 2017

(65) Prior Publication Data

US 2018/0203914 A1 Jul. 19, 2018

(51) Int. Cl.
*G06F 11/34* (2006.01)
*G06F 11/36* (2006.01)

(52) U.S. Cl.
CPC ...... *G06F 11/3457* (2013.01); *G06F 11/3688* (2013.01)

(58) Field of Classification Search
CPC .................................................. G06F 17/30598
USPC ........................................................ 717/135
See application file for complete search history.

(56) References Cited

U.S. PATENT DOCUMENTS

| | | | | |
|---|---|---|---|---|
| 7,131,069 B1* | 10/2006 | Rush | ...................... | G06F 3/0482 715/738 |
| 9,317,412 B1* | 4/2016 | Cohen | ................. | G06F 11/3688 |
| 9,921,930 B2* | 3/2018 | Masser | ............... | G06F 11/2635 |
| 2012/0311309 A1* | 12/2012 | Fillipi | ........................ | G06F 9/44 713/1 |
| 2013/0007523 A1* | 1/2013 | Unger | ................. | G06F 11/3664 714/32 |
| 2014/0380266 A1* | 12/2014 | Bornhoevd | ............... | G06F 8/20 717/104 |
| 2015/0039285 A1* | 2/2015 | Qian | ..................... | G06Q 30/00 703/21 |
| 2017/0046249 A1* | 2/2017 | Oliver | ................ | G06Q 10/0633 |
| 2017/0286273 A1* | 10/2017 | Lau | ...................... | G06F 11/3668 |
| 2017/0329838 A1* | 11/2017 | Schmidtler | .......... | G06F 17/3053 |

OTHER PUBLICATIONS

Patel, M. (2008). Discover SAP ERP Financials. Galileo Press, Chapter 2 (Year: 2008).*

* cited by examiner

*Primary Examiner* — James D. Rutten
(74) *Attorney, Agent, or Firm* — Jones Day

(57) ABSTRACT

A computer-implemented method of testing a compatibility of an update to an enterprise resource planning system that includes clustering documents into groups, where documents are generated from transactional data of an enterprise stored in an in-memory database and have attributes. Groups are stored in memory and include documents that are structurally identical. According to method, one or more processors then add one document from each group into a test set of documents, run a simulation of the update on this test set, and based on the simulation provide data characterizing the compatibility of the update. Related apparatus, systems, techniques and articles are also described.

17 Claims, 10 Drawing Sheets

FIG. 4

| | RBUKRS (410) | BELNR (420) | GJAHR (430) | BUZEI (440) | RACCT (450) | WSL (460) | RWCUR (470) |
|---|---|---|---|---|---|---|---|
| 1 | 0097 | 0003000049 | 2001 | 001 | 0000111007 | 1.100 | EUR |
| 2 | 0097 | 0003000049 | 2001 | 002 | 0000071000 | -1.100 | EUR |
| 3 | 0097 | 0003000147 | 2006 | 001 | 0000173000 | 5.38 | EUR |
| 4 | 0097 | 0003000147 | 2006 | 002 | 0000154000 | -5.38 | EUR |
| 5 | 0097 | 0003000150 | 2007 | 001 | 0000476000 | 5.38 | EUR |
| 6 | 0097 | 0003000150 | 2007 | 002 | 0000173000 | -5.38 | EUR |
| 7 | 0097 | 0003000173 | 2008 | 001 | 0000173000 | 14.93 | EUR |
| 8 | 0097 | 0003000173 | 2008 | 002 | 0000154000 | -14.93 | EUR |
| 9 | 0097 | 0003000183 | 2009 | 001 | 0000476000 | 14.93 | EUR |
| 10 | | 0003000183 | 2009 | 002 | 0000173000 | -14.93 | EUR |
| 11 | 0097 | 0003000000 | 2009 | 001 | 0000070000 | 25.000 | EUR |
| 12 | 0097 | 3600000024 | 2009 | 002 | 0000070000 | -25.0.. | EUR |
| 13 | 0097 | 3600000024 | 2009 | 001 | 0000071000 | 1.100 | EUR |
| 14 | 0097 | 3600000035 | 2009 | 002 | 0000000005 | -1.100 | EUR |

400, 480, 490

| | RACCT_1 | RACCT_2 | RACCT_3 | RACCT_4 | COUNT() |
|---|---------|---------|---------|---------|---------|
| 1 | 0000173000 | 0000478200 | ? | ? | 2 |
| 2 | 0000154000 | 0000173000 | ? | ? | 2 |
| 3 | 0000070000 | 0000070500 | ? | ? | 1 |
| 4 | 0000071000 | 0000011007 | ? | ? | 1 |
| 5 | 0000071000 | 0000090005 | ? | ? | 1 |

FIG. 5

```
<window_function_type> ::= <rank_func>           | <dense_rank_func>     |
<row_number_func>
<ntile_func>                 | <percent_rank_func>   | <cume_dist_func>      |
<window_aggregate_func>      | <lead_func>           | <lag_func>            |
<inverse_distribution_function> | <weighted_avg_func>   | <linear_approx_func>  |
<random_partition_func>      | <cubic_spline_func>   | <binning_func>        |
                             | <series_filter_func>
```

FIG. 9

DOCUMENT CLUSTERING IN IN-MEMORY DATABASES

TECHNICAL FIELD

The subject matter described herein relates to computer-implemented methods and systems of document clustering in in-memory databases for reducing time and cost of confirming normal operation of system upgrades.

BACKGROUND

Typical enterprise resource planning (ERP) systems are very complex with respect to user-specific settings and customizing. A posting engine within ERP is typically also complex. Implementation of new functions or new settings in such environment may be lengthy and costly, especially when a magnitude of a change demands checking of the processes on customer side due to a concern that important processes might get broken.

An existing approach to such changes is to make sure everything will go well after introduction of new functionality. This is typically accomplished by taking financial accounting (FI) documents and posting and processing them twice: once in the current ERP system with the current customizing parameters which are known to be working fine; and the other time through a posting engine that runs in parallel and in the background to the active ERP system and that runs with new customizing. This background testing allows the user or developer to see if processes that have been defined in the particular customer's system with the new customizing settings run into problems or not and to adjust the background system accordingly until it works satisfactorily.

An expectation is that processes in manufacturing, sales, human resources (HR) will stay as they are. It is possible then to take FI documents that result from these processes and run them through an accounting system that has been upgraded with new settings to check if the documents can be posted or not. The main disadvantage of this approach, especially for larger users, is that it takes a long time to run all the documents posted in a given time period, typically in the most recent fiscal year. Such testing can be running for a week or longer due primarily to a large number of documents, reaching upward of one hundred million documents for large enterprises.

The current solution to the underlying problem is running the project in phases. The longest phase, usually spanning several months, is where the new customizing is applied in simulation mode. This approach allows to identify and adapt processes that are not compatible with the changed customizing, prior to Go Live, but it has many disadvantages. Disadvantages of the current process include long implementation times, error messages coming from the simulation jeopardizing important processes in the logistics, this simulation phase running for the whole year in order to identify all incompatible processes so that it would encompass month end, quarter end, and year end closings. This is not acceptable for customers, and some of them may be forced to conduct incomplete simulations prior to Go Live and retain some residual risk.

SUMMARY

In a first aspect, a computer-implemented method of testing a compatibility of an update to an enterprise resource planning system may include clustering documents into groups, each group may include documents that are structurally identical, documents may be generated from transactional data of an enterprise stored in an in-memory database, and each document may have at least one attribute. Groups may then be stored in a memory. One or more processors then may add one document from each group into a test set of documents, run a simulation of the update on the test set of documents; and provide data characterizing the compatibility of the update based on the simulation.

Providing data may include at least one of: displaying the data characterizing the compatibility of the update in an electronic visual display, transmitting the data characterizing the compatibility of the update to a remote computing system, loading the data characterizing the compatibility of the update into memory, or storing the data the compatibility of the update in physical persistence.

Attributes may include one of the following: company code, document number, fiscal year, document line, general ledger account, amount in transaction currency, and transaction currency code. Attributes may include a document type and a general ledger account. Update may include customizing settings of the enterprise resource planning system. Update may include implementation of document splitting. Structurally identical documents may include documents with the same document type and the same general ledger account. Clustering may include a hard coded selection of the structurally identical documents. Clustering may include a user defined selection of the structurally identical documents.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. Since all data is available in-memory as data in a modern in-memory relational database, document clustering may be realized without system crushes and in such a way that document clustering results are generated reliably. Once document clustering is accomplished, test runs of new functionality may be conducted on a much smaller set of documents and may be executed as separate simulations based on historical data, instead of running in parallel with an active system. This, in turn, leads to faster, less expensive, and reliable confirmation of new functionality or of new settings, saving user time and money. Project implementation time may be shortened by months. This approach results in no harm for the production system and less issues after Go Live because of the inherently more systematic approach.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is an example of a list of a subset of FI documents prior to document clustering.

FIG. 5 is an example of groups of documents according to posted accounts after document clustering.

FIG. 9 is an example of a syntax for a window function.

Like reference symbols in the various drawings indicate like elements.

DETAILED DESCRIPTION

Solution proposed here includes a process to cluster FI documents into groups of documents that are the same with respect to changed settings. Selected documents may be the ones posted in a certain time period. Time period may be a month, a quarter, a fiscal year, or longer. An ERP process may result in FI documents which are posted on certain general ledger accounts. Documents may include account assignments such as profit centers, segments, value added text flags, and others. Documents in a group may be structurally the same, which may mean that they are posted on the same general ledger (GL) accounts and have the same type of account assignments. It may be possible to take one FI document from each group, run them though accounting engine, and see if it still works with new settings.

For a large enterprise, system scan with a clustering algorithm may result in several hundred, or several thousand, or several tens of thousands of groups. For each of these groups of documents it may be possible to take one document, run it through accounting engine, and confirm if the result is still valid. Without clustering, it may be required to run over a hundred million documents through an accounting engine even if it is known that most documents are the same, or have a high level of similarity between them.

It is much faster to build groups of documents in in-memory database than in conventional row database, and take one document as an example of the group in order to evaluate if the new settings work properly. Efficient clustering of documents consisting of several line items would not be possible in standard databases. The reason for this is that standard row based databases are not fast enough to run such clustering. If such algorithm or an SQL statement is attempted on a traditional database, the runtime will most likely be unacceptable for the user. In an in-memory database such as SAP-HANA, it can be done with an acceptable reaction time.

Figure 1:
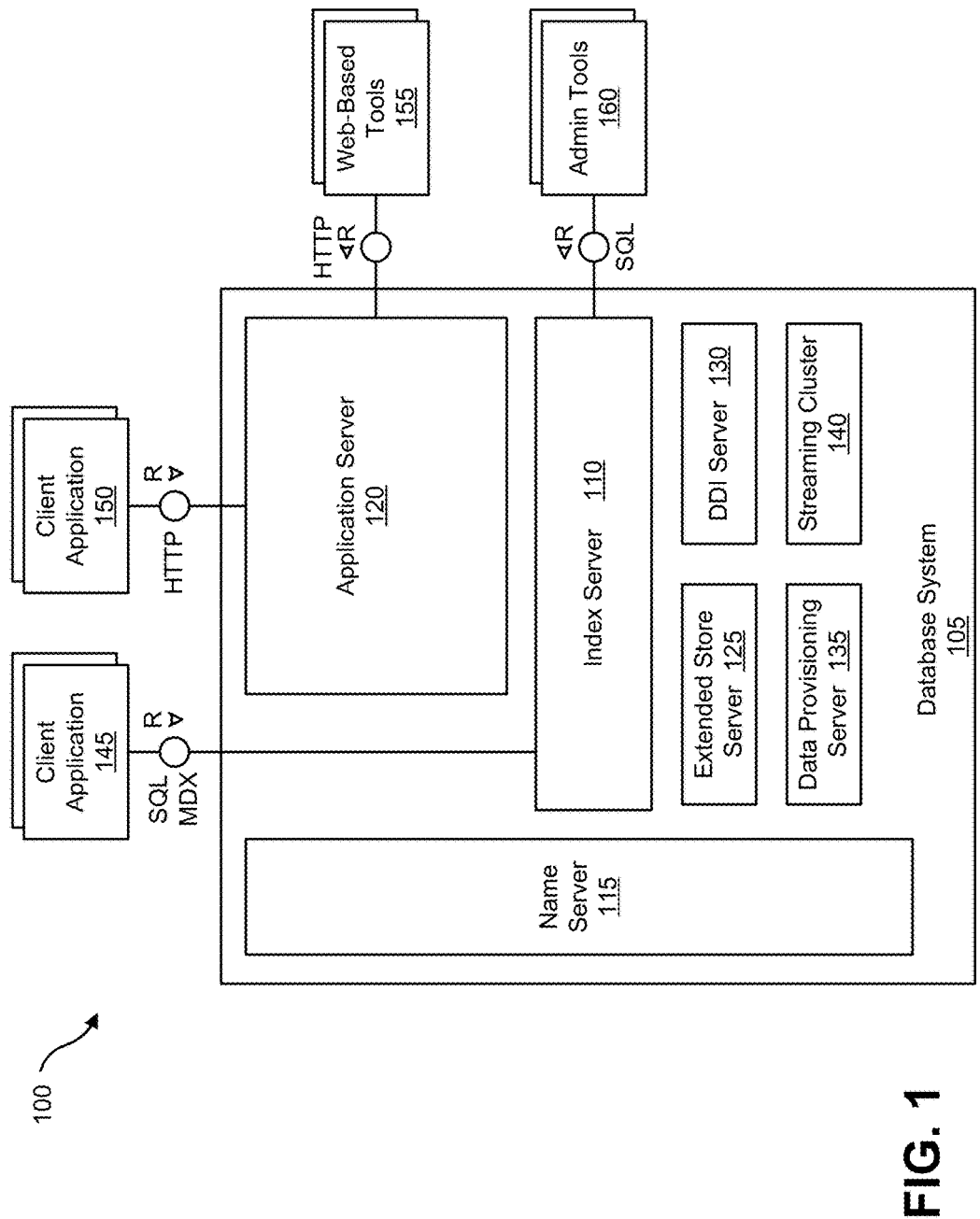
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
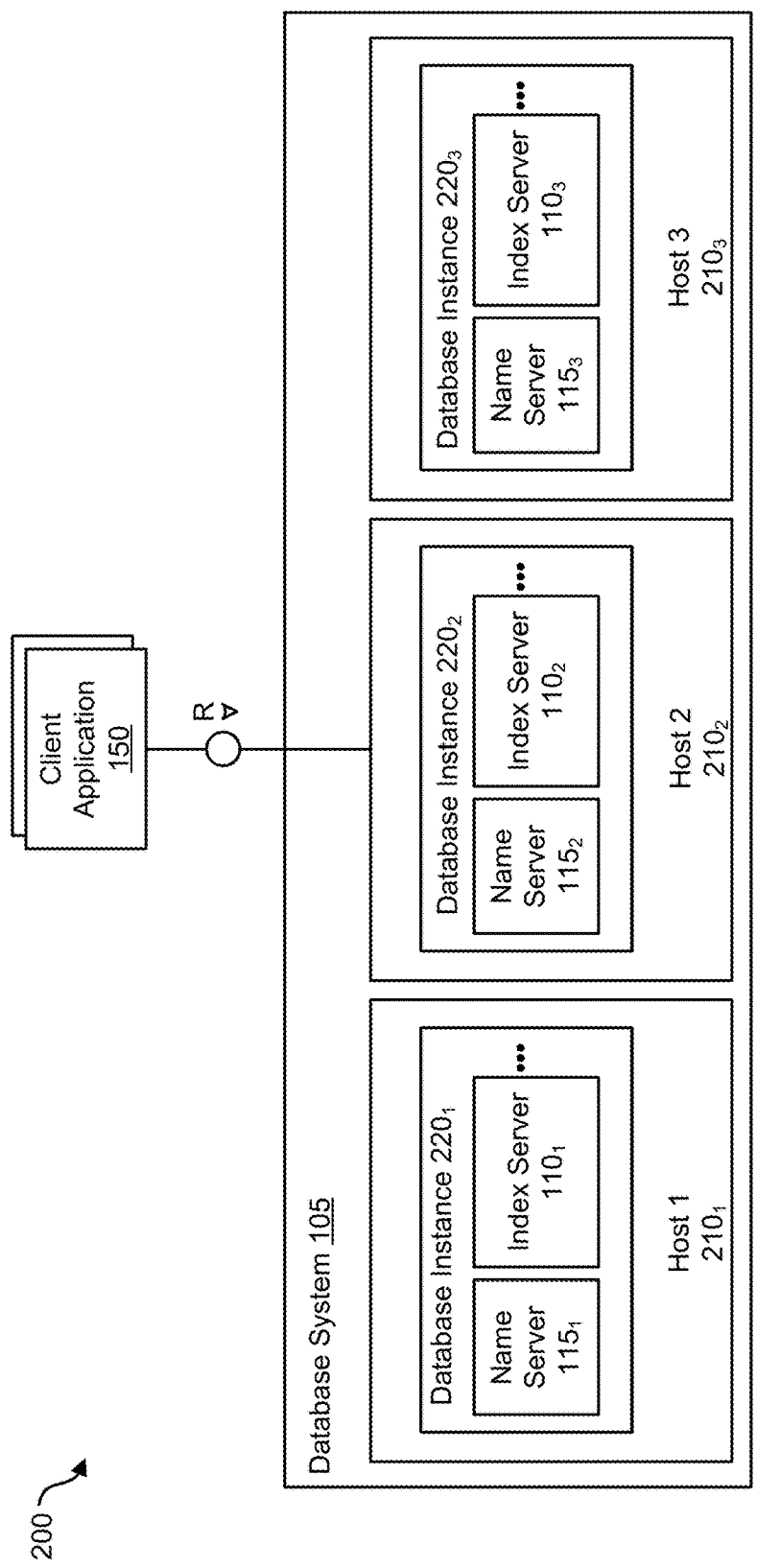
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
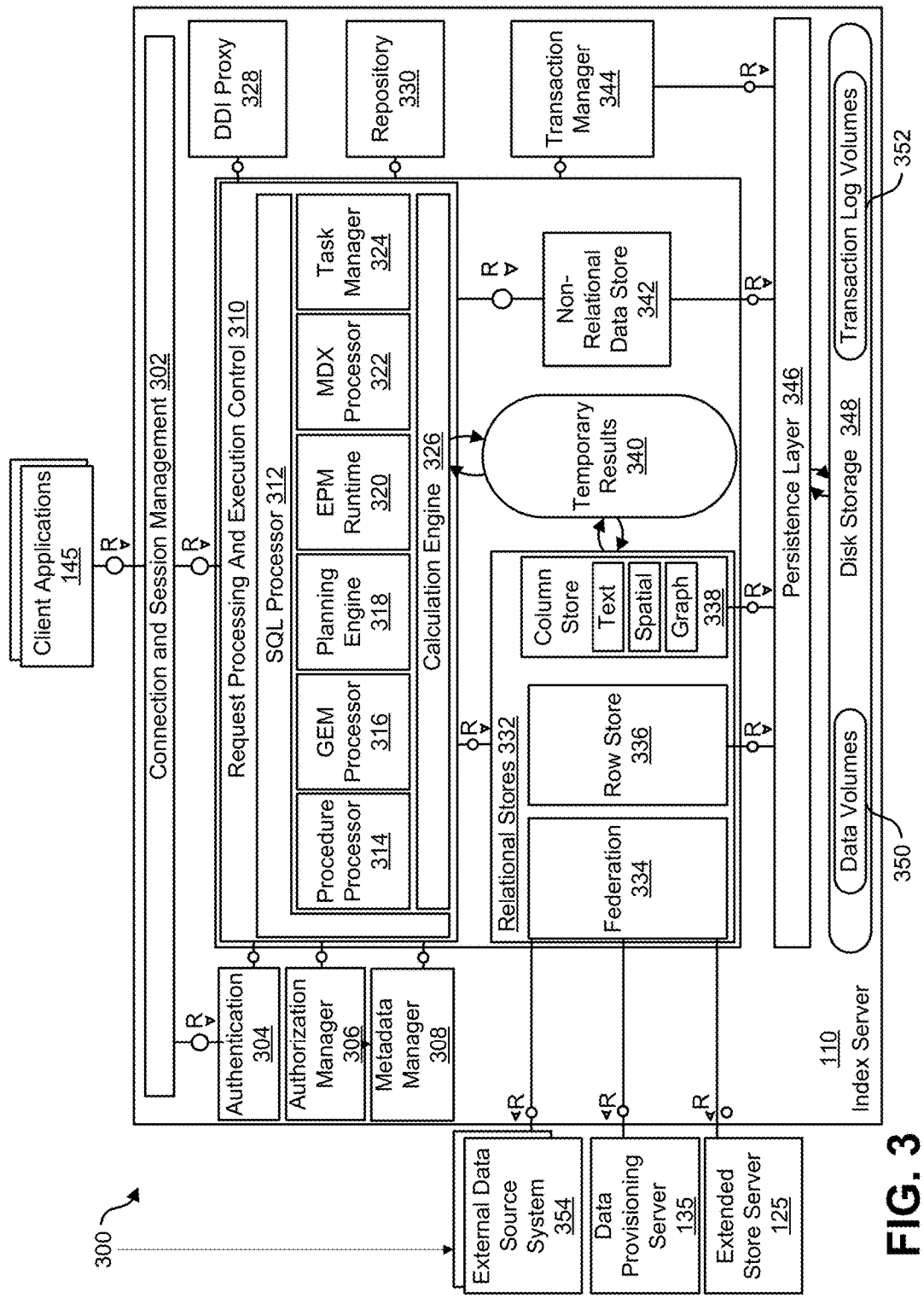
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

FIG. 4 is an example of a list of a subset of FI documents in a company prior to document clustering. List 400 may include documents characterized by various attributes. These attributes may include company code (410), document number (420), fiscal year (430), document line (440), general ledger account (450), amount in transaction currency (460), and transaction currency code (470). Other attributes may also be included.

List 400 may include two documents 480 and 490 that are structurally identical. Being structurally identical is to have the same relevant attributes. In this example, documents 480 and 490 are the same because they book the same accounts. Document may include one line, two lines, or more than two lines. In this example, each of the documents 480 and 490 includes two lines.

FIG. 5 is an example of groups of documents according to posted accounts after document clustering. In this example, groups of documents according to posted accounts were created using window function. Groups of documents may be created using other document search and selection tools. List 500 may be a list of groups of clustered documents. Document clustering into groups may occur according to criteria appropriate for the specific change or upgrade being tested.

Each group of clustered documents may be characterized by general ledger account RACCT_1 (510), general ledger account RACCT_2 (520), and other general ledger accounts RACCT_3 (530) and RACCT_4 (540). Number of listed general ledger accounts may be one, two, three, four, or more than four. Column COUNT (*) (550) may show a number of documents that contain the respective accounts. In this example, group 560 may contain two documents clustered together in a single group. These two documents may be in the same group 560 because their general ledger account RACCT_1 (510) is the same and their general ledger account RACCT_2 (520) is the same. General ledger account RACCT_1 (510) and general ledger account RACCT_2 (520), however, may be different from each other. The specific criteria for clustering documents into a single group may depend on specific change or upgrade being tested.

Document clustering may be implemented for any system upgrade or significant change of settings. One example of such change of system settings is document splitting. The accounting principles US GAAP and IFRS require companies to perform segment reporting. The document splitting procedure (also called online document split) is a prerequisite for creating financial statements at any time for the segment dimension. Introduction of the online document split is usually an expensive project for customers. One of the most important parts of the project is making sure that journal entries, which come from manufacturing, logistics, HR, and other sources, and which are posted within any system application, are compatible with the massively changed customizing settings. Such compatibility may be required by the introduction of the online document split.

Figure 6:
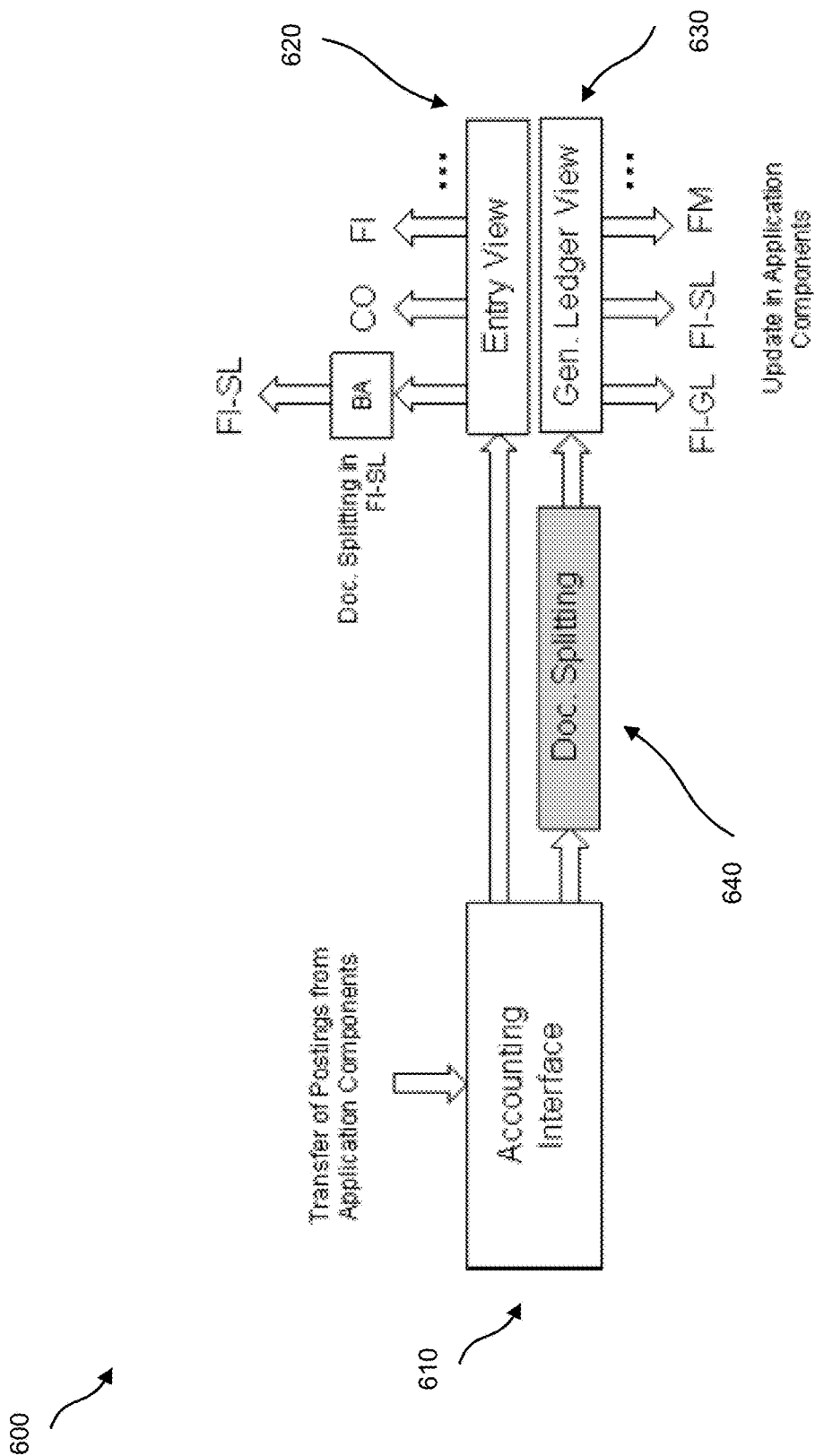
FIG. 6 is a diagram illustrating data flow of documents when document splitting is applied.

FIG. 6 is a diagram illustrating data flow 600 of documents when document splitting is applied. Document splitting 640 may be inserted between accounting interface 610 and a general ledger view 630. Entry view 620 may also be available to provide document viewing to financial accounting (FI), special purpose ledgers (FI-SL), and controlling (CO). Document splitting may use document splitting characteristics as account assignment objects to portray the dimensions. Document splitting may have an effect on subsequent processes, such as closing operations, and on processes in controlling.

Process of implementation of document splitting is one example of change in system settings where a change is significant enough to warrant checking that accounting engine still works after a change is made. A full list of FI documents, which may contain more than 100 million documents, may be clustered into groups according to characteristics that are relevant to this kind of change.

Figure 7:
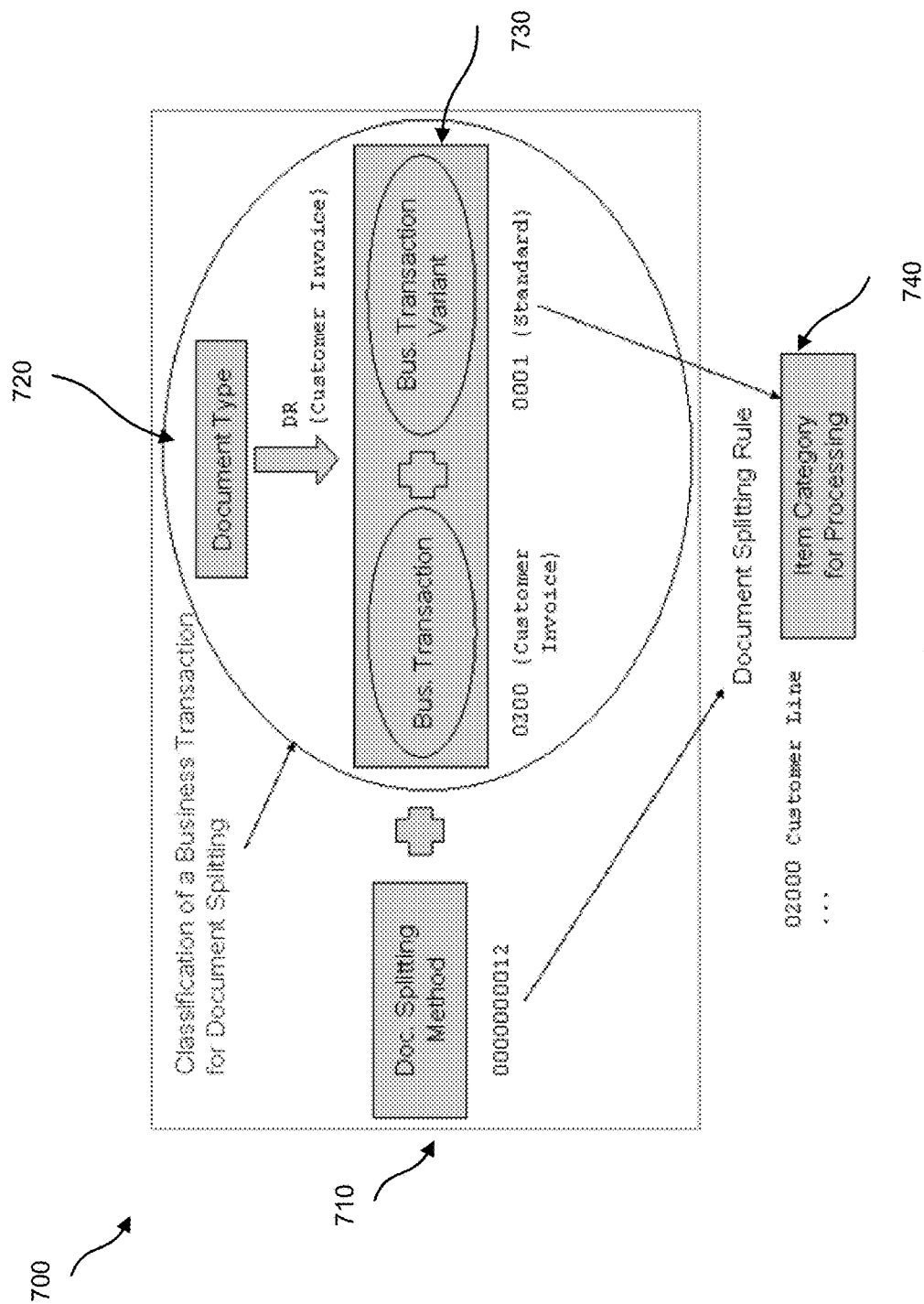
FIG. 7 is a diagram illustrating customizing of a document splitting process.

FIG. 7 is a diagram illustrating customizing of a document splitting process 700. Document splitting may be based on unique assignment of document types 720 to predefined, non-modifiable business transactions or their attributes in a business transaction variant 730, as well as on the assignment of accounts to predefined, non-modifiable item categories 740. The item categories 740 may be used to define document splitting rules, which, depending on the business transaction, may determine which items of a document the system splits and how. A document splitting rule may be assigned to a document splitting method. To activate document splitting, a document splitting method may be assigned. A document splitting method may contain the document splitting rules that the system uses to split documents.

Figure 8:
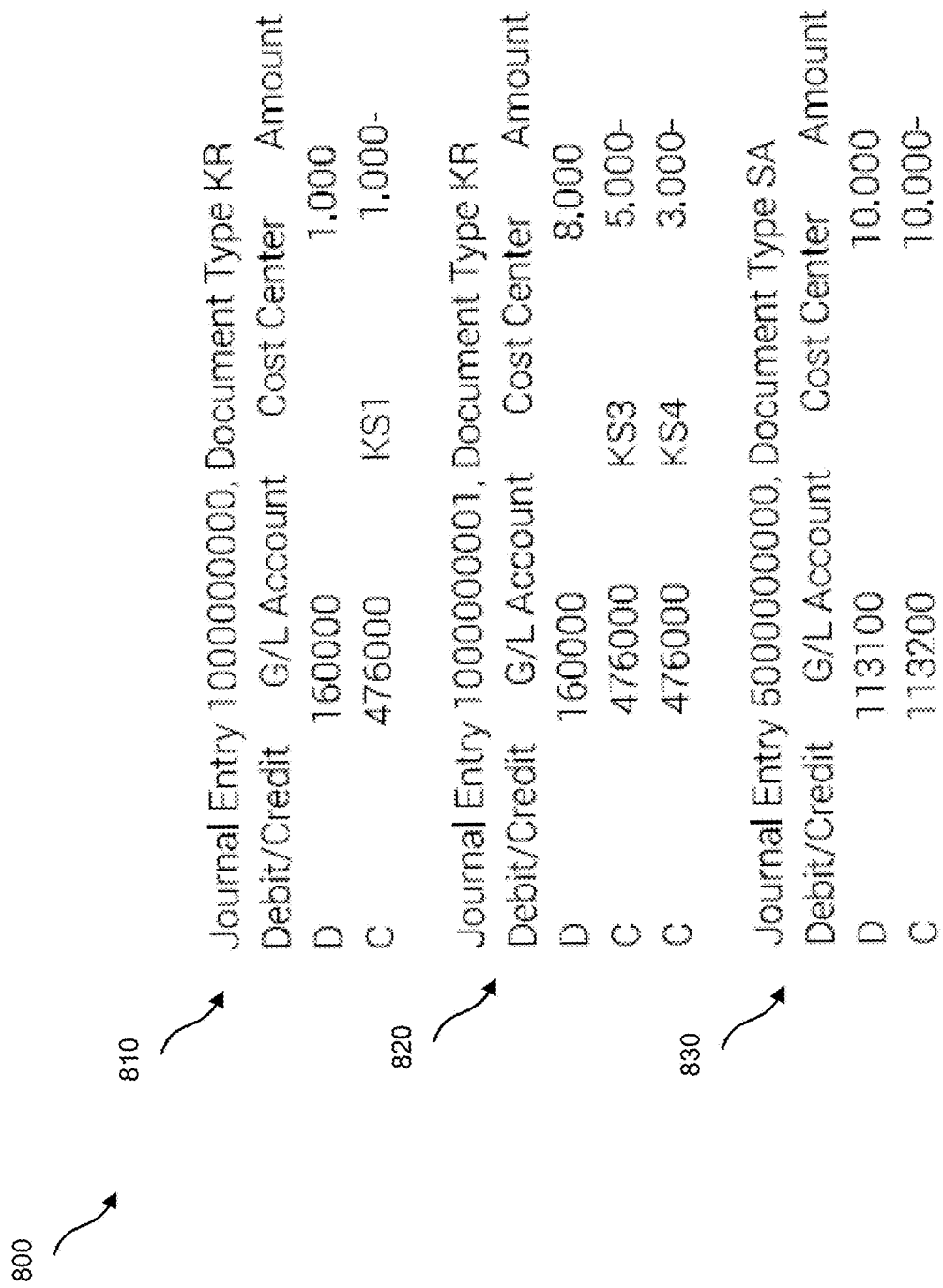
FIG. 8 is an example illustrating application of document clustering to implementation of document splitting.

FIG. 8 is an example illustrating application of document clustering to implementation of document splitting. In this simple example there are three journal entries 810, 820, and 830. Two journal entry patterns 810 and 820 can be clustered together in the same group, considering document type and general ledger account. Typically, these are the two most important characteristics for online document split customizing. Selection of characteristics for implementation of other processes, upgrades, or settings may be different. After identifying the patterns in the journal entries online split simulation can be run only for the representatives of each identified pattern, thus significantly reducing the amount of data that needs to be processed.

FIG. 9 is an example of a syntax for a window function 900. A window function is an example of an approach to document clustering. Window functions 900 are examples of functionality in SAP-HANA that may be used to implement document clustering in SQL.

Figure 10:
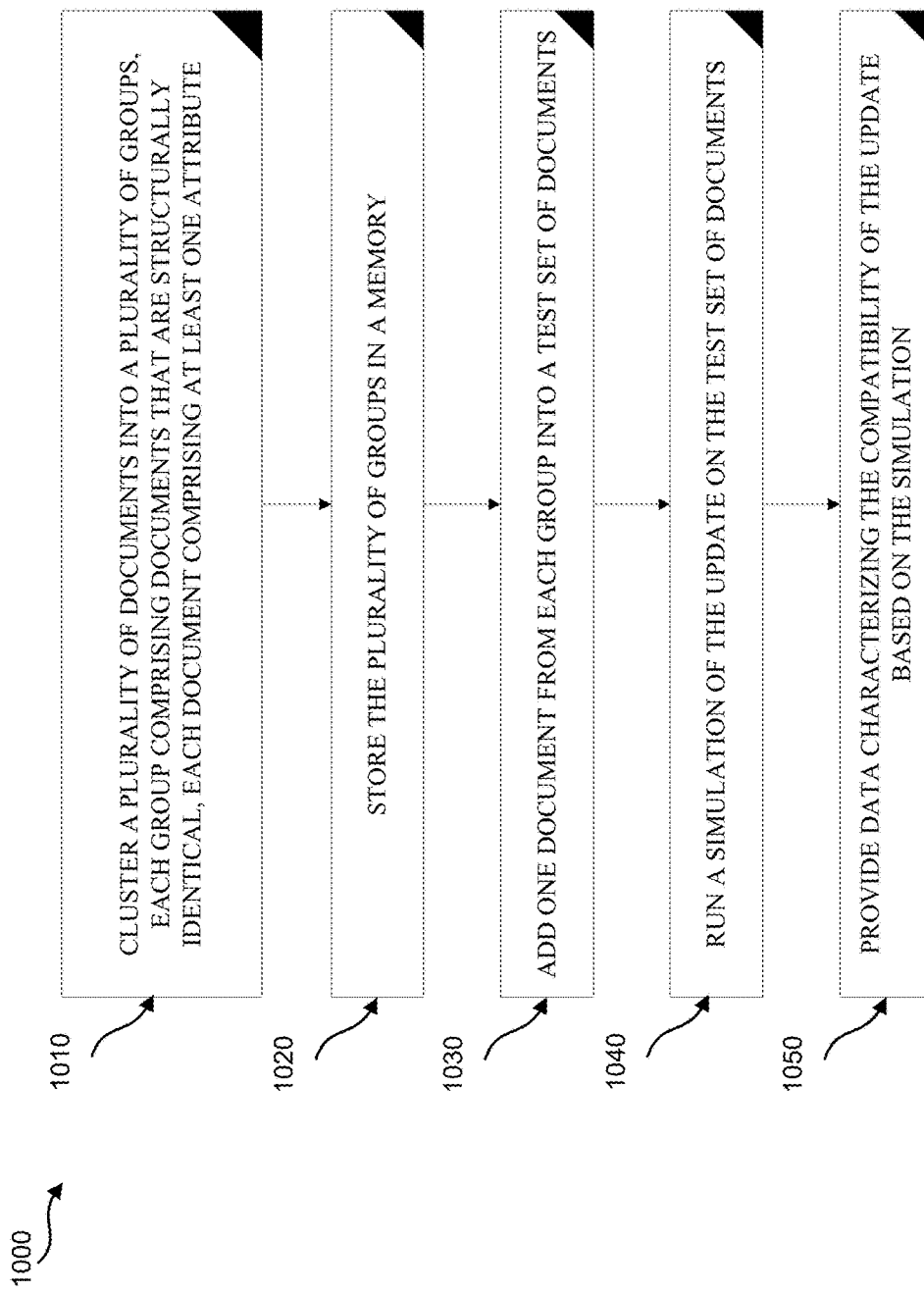
FIG. 10 is a process flow diagram illustrating an example of testing compatibility of an update to an enterprise resource planning system.

FIG. 10 is a process flow diagram illustrating one example of testing compatibility of an update to an enterprise resource planning system. Process 1000 starts with step 1010, where a plurality of documents may be clustered into a plurality of groups, each group comprising documents that are structurally identical, and each document comprising at least one attribute. In step 1020, the plurality of groups are stored in a memory. In step 1030, one document from each group may be added to a test set of documents. In step 1040, a simulation of the update may run on the test set of documents. In step 1050, data characterizing the compatibility of the update based on the simulation may be provided.

Sometimes document clustering is applied when FI document attributes that are relevant to building groups are known. One example of such case is document splitting. Relevant document attributes for applying document clustering to document splitting may include document type in document header, general ledger (GL) accounts, and value added text field in the line items. For other processes, there may be other relevant characteristics that are known. When relevant document attributes are known, document clustering may be hard coded and specific to implementation.

In some cases, relevant document attributes may be not known. In these cases, document clustering may be defined by a user or a customer, rather than being hard coded or defined by system. Manufacturing and HR are processes run by customer that result in FI documents that are posted in FI. For clustering of documents FI document characteristics such as document type, GL account, profit center, may be relevant for putting single documents in the clustered groups. Other attributes may be relevant as well.

With document clustering it now becomes possible to apply pattern recognition in transaction documents to identify repeated usage of the same document types or entries. Instead of having to let document splitter to run in the background for a long time, simulations can now be performed for each identified document cluster based on past data sets. This simulation process is required for each identified document cluster only once, which may significantly reduce the effort for testing the splitter. As a result, the background run of the splitter can be reduced to a short period of time only or it could even be omitted completely.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of testing a compatibility of an update to an enterprise resource planning system, the method comprising:

clustering, by one or more processors, a plurality of documents into a plurality of groups, each group comprising accounting documents that are structurally identical, the plurality of documents being generated from transactional data of an enterprise stored in an in-memory database, each document comprising at least one attribute;

storing the plurality of groups in a memory;

adding, by the one or more processors, one document from each group into a test set of documents;

running, by the one or more processors, a simulation of the update on the test set of documents; and providing, by the one or more processors, data characterizing the compatibility of the update based on the simulation, wherein the update comprises implementation of document splitting, and wherein the clustering comprises an assignment of the plurality of documents to predefined, non-modifiable attribute categories, the attribute categories define document splitting rules, and the document splitting splits the at least one attribute of each document according to the document splitting rules.

2. The method of claim 1, wherein the at least one attribute comprises one of the following: company code, document number, fiscal year, document line, general ledger account, amount in transaction currency, and transaction currency code.

3. The method of claim 1, wherein the update comprises customizing settings of the enterprise resource planning system.

4. The method of claim 1, wherein the at least one attribute comprises a document type and a general ledger account.

5. The method of claim 4, wherein structurally identical documents comprise documents with the same document type and the same general ledger account.

6. The method of claim 1, wherein clustering further comprises a hard coded selection of the structurally identical documents.

7. The method of claim 1, wherein clustering further comprises a user defined selection of the structurally identical documents.

8. The method of claim 1, wherein providing data comprises at least one of: displaying the data characterizing the compatibility of the update in an electronic visual display, transmitting the data characterizing the compatibility of the update to a remote computing system, loading the data characterizing the compatibility of the update into memory, or storing the data characterizing the compatibility of the update in physical persistence.

9. A computer system to test compatibility of an update to an enterprise resource planning system, the computer system comprising:
   a memory to store a plurality of documents and a plurality of groups, the plurality of documents being generated from transactional data of an enterprise stored in an in-memory database, each document comprising at least one attribute; and
   one or more processors operable to:
      cluster the plurality of documents into the plurality of groups, each group comprising accounting documents that are structurally identical;
      add one document from each group into a test set of documents;
      run a simulation of the update on the test set of documents; and
      provide data characterizing the compatibility of the update based on the simulation,
   wherein the update comprises implementation of document splitting, and
   wherein to cluster comprises to assign the plurality of documents to predefined, non-modifiable attribute categories, the attribute categories define document splitting rules, and the document splitting splits the at least one attribute of each document according to the document splitting rules.

10. The computer system of claim 9, wherein the at least one attribute comprises one of the following: company code, document number, fiscal year, document line, general ledger account, amount in transaction currency, and transaction currency code.

11. The computer system of claim 9, wherein the update comprises customizing settings of the enterprise resource planning system.

12. The computer system of claim 9, wherein the at least one attribute comprises a document type and a general ledger account.

13. The computer system of claim 12, wherein structurally identical documents comprise documents with the same document type and the same general ledger account.

14. The computer system of claim 9, wherein to cluster the plurality of documents into the plurality of groups further comprises to cluster a hard coded selection of the structurally identical documents.

15. The computer system of claim 9, wherein to cluster the plurality of documents into the plurality of groups further comprises to cluster a user defined selection of the structurally identical documents.

16. The computer system of claim 9, wherein to provide data further comprises at least one of: to display the data characterizing the compatibility of the update in an electronic visual display, to transmit the data characterizing the compatibility of the update to a remote computing system, to load the data characterizing the compatibility of the update into memory, or to store the data characterizing the compatibility of the update in physical persistence.

17. A non-transitory computer readable medium containing program instructions, wherein execution of the program instructions by one or more processors of a computer system causes the one or more processors to test a compatibility of an update to an enterprise resource planning system, the testing comprising:
   clustering, by the one or more processors, a plurality of documents into a plurality of groups, each group comprising accounting documents that are structurally identical, the plurality of documents being generated from transactional data of an enterprise stored in an in-memory database, each document comprising at least one attribute;
   storing the plurality of groups in a memory;
   adding, by the one or more processors, one document from each group into a test set of documents;
   running, by the one or more processors, a simulation of the an update on the test set of documents; and
   providing, by the one or more processors, data characterizing the compatibility of the update based on the simulation,
   wherein the update comprises implementation of document splitting, and
   wherein the clustering comprises an assignment of the plurality of documents to predefined, non-modifiable attribute categories, the attribute categories define document splitting rules, and the document splitting splits the at least one attribute of each document according to the document splitting rules.

* * * * *